(12) United States Patent
Acosta Loyola

(10) Patent No.: US 10,029,546 B2
(45) Date of Patent: Jul. 24, 2018

(54) ELECTRIC SOFT CAP FOR PICKUP TRUCK BED

(71) Applicant: FORD GLOBAL TECHNOLOGIES, LLC, Dearborn, MI (US)

(72) Inventor: Mauricio Acosta Loyola, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/157,938

(22) Filed: May 18, 2016

(65) Prior Publication Data

US 2017/0334274 A1 Nov. 23, 2017

(51) Int. Cl.
*B60J 7/04* (2006.01)
*B60J 7/06* (2006.01)
*B60P 7/04* (2006.01)

(52) U.S. Cl.
CPC .............. *B60J 7/062* (2013.01); *B60P 7/04* (2013.01)

(58) Field of Classification Search
CPC ..................................... B60J 7/04; B60J 7/062
USPC ......... 296/100.05, 100.12, 100.18, 104, 105, 296/165
See application file for complete search history.

(56) References Cited

U.S. PATENT DOCUMENTS

| | | | |
|---|---|---|---|
| 3,874,721 A * | 4/1975 | Tuggle | B60J 7/062 296/105 |
| 4,786,099 A | 11/1988 | Mount | |
| 5,005,896 A * | 4/1991 | Li | B60J 7/062 135/129 |
| 5,040,843 A | 8/1991 | Russell et al. | |
| 5,257,850 A | 11/1993 | Brim | |
| 5,516,182 A * | 5/1996 | Aragon | B60P 3/34 296/100.05 |
| 5,584,521 A * | 12/1996 | Hathaway | B60J 7/104 224/405 |
| 6,000,745 A | 12/1999 | Alexa | |
| 6,053,556 A | 4/2000 | Webb | |

(Continued)

OTHER PUBLICATIONS

"GatorTrax Electric Tonneau Cover"; GatorCovers Factory Direct; http://gatorcovers.com/p-5965-gatortrax-electric-tonneau-cover.aspx; pp. 1-2; printed Feb. 2, 2016.

(Continued)

*Primary Examiner* — Dennis H Pedder
(74) *Attorney, Agent, or Firm* — Jason Rogers; King & Schickli PLLC

(57) ABSTRACT

A deployable cap assembly for a pickup truck bed includes a collapsible frame assembly, at least one motor operatively connected to the collapsible frame assembly, and a frame guide system. A flexible cover is attached to the collapsible frame assembly. The frame guide system may include a pair of guide channels disposed at opposed bed sides of the pickup truck bed and a pulley system operatively connected to the at least one motor and to a portion of the collapsible frame assembly. A controller operatively connected to the at least one motor is configured to at least partially translate the collapsible frame assembly between a fully stowed position and a fully deployed position. An actuator is operatively connected to the at least one motor and/or to the controller. One or more actuable light sources may be disposed on the collapsible frame assembly and/or the flexible cover.

17 Claims, 4 Drawing Sheets

(56) References Cited

U.S. PATENT DOCUMENTS

| | | | |
|---|---|---|---|
| 6,234,561 B1 | 5/2001 | Huotari | |
| 6,257,260 B1* | 7/2001 | Phillips | B62D 33/04 |
| | | | 135/129 |
| 6,471,282 B2* | 10/2002 | Hanning | B60J 7/065 |
| | | | 296/100.12 |
| 6,641,201 B1 | 11/2003 | Pietryga et al. | |
| 6,974,176 B2 | 12/2005 | Smith et al. | |
| 7,261,362 B1* | 8/2007 | Mendez | B60J 7/064 |
| | | | 296/100.09 |
| 9,150,259 B2 | 10/2015 | Jutila et al. | |
| 2008/0088151 A1 | 4/2008 | Shagbazyan | |
| 2010/0026037 A1* | 2/2010 | Opie | B60J 7/062 |
| | | | 296/100.12 |

OTHER PUBLICATIONS

"Bizon Electric Tonneau Cover"; RealTruck.com; https://www.realtruck.com/bizon-electric-tonneau-cover/?gclid=CLelxbuQ5MwCFQmqaQodrjAJaQ; pp. 1-2; printed Feb. 2, 2016.

"Retractable Truck Bed Cover for Utility Trucks"; Pace-Edwards; http://www.pace-edwards.com/utility-bed-cover; pp. 1-3; printed Feb. 2, 2016.

"PowertraxONE MX"; Retrax; http://www.retrax.com/products/powertraxone-mx/; pp. 1 of 1; printed Feb. 2, 2016.

* cited by examiner

ELECTRIC SOFT CAP FOR PICKUP TRUCK BED

TECHNICAL FIELD

This disclosure relates generally to covers for pickup truck beds. In particular, the disclosure relates to a deployable pickup truck bed cap.

BACKGROUND

Pickup truck cargo areas, specifically the pickup truck bed, provide a convenient and utilitarian means of transporting large cargo. The user need simply place any desired items in the truck bed, close the liftgate, and transport the items. However, items placed in the pickup truck bed are exposed to the elements, and may be damaged by moisture (rain, snow, etc.) or displaced by wind forces created by the vehicle speed during transport. Often users tie a tarpaulin over items placed in a pickup truck bed to protect them from the elements and to hide them from view. A disadvantage to this solution is that if not properly secured, the tarpaulin can work loose due to wind forces. Tying a tarpaulin down over a load placed in a pickup truck bed is inconvenient and unattractive, and ropes or bungee cords used to secure the tarpaulin risk damaging vehicle paint.

One known alternative solution is to provide a tonneau cover for covering the pickup truck bed cargo area. A number of hard and soft embodiments of tonneau covers for pickup truck beds are known, including hard tonneau covers that are hinged at one end and effectively function similarly to an automobile trunk. It is also known to provide soft tonneau covers, i.e. tonneau covers made of flexible materials and configured to deploy by unfolding, unrolling, etc. to cover the pickup truck bed. Such soft tonneau covers may be deployed manually or by motorized means. While effective in hiding pickup bed contents from view and protecting them from the elements, tonneau covers typically are disposed substantially flush with the upper edges of the pickup truck bed sides and the liftgate. As such, covering items that extend over a top of those pickup truck bed side/liftgate upper edges is difficult or impossible.

For that reason, it is known to provide aftermarket truck bed caps which are defined by side edges and a top, and which provide coverage of an area that may extend upwardly from the truck bed to a plane defined by a pickup truck passenger compartment roof, or even higher. Such aftermarket pickup truck bed caps, while effective for their intended purpose, are typically heavy and cumbersome to install and remove.

To solve this and other problems, the present disclosure relates to deployable pickup truck bed cap. Advantageously, the described deployable pickup truck bed cap is flexible and lightweight, and is easily deployed for use in covering items but retracted when covering the pickup truck bed is not desired.

SUMMARY

In accordance with the purposes and benefits described herein, in one aspect of the disclosure a deployable cap assembly for a pickup truck bed is described, comprising a collapsible frame assembly and at least one motor operatively connected to the collapsible frame assembly. A flexible cover is attached to the collapsible frame assembly. A frame guide system is provided, disposed on opposed pickup truck bed sides. A cap assembly housing may be provided into which the collapsible frame assembly can be stowed. The housing may be disposed adjacent to a pickup truck passenger compartment.

In embodiments, the frame guide system includes a pair of guide channels disposed at opposed bed sides of the pickup truck bed. The at least one motor reversibly drives a pulley system operatively connected to at least a portion of the collapsible frame assembly for translation between a fully retracted and a fully deployed configuration along the pair of guide channels. The pulley system may include a belt or strip operatively connected to at least a portion of the collapsible frame assembly.

A controller may be included, operatively connected to the motor and configured to at least partially translate the collapsible frame assembly between a fully stowed position and a fully deployed position. Likewise, an actuator may be included, in embodiments operatively connected to the motor and/or to the controller. The actuator in embodiments is associated with one or more of a pickup truck passenger compartment element, a pickup truck door element, a key fob, a smartkey, the pickup truck bed, and a pickup truck bed liftgate. Optionally, one or more actuable light sources may be disposed on the collapsible frame assembly and/or the flexible cover.

In the following description, there are shown and described embodiments of the disclosed deployable pickup truck bed cap. As it should be realized, the device is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed deployable pickup truck bed cap, and together with the description serve to explain certain principles thereof. In the drawings.

Reference will now be made in detail to embodiments of the disclosed deployable pickup truck bed cap assembly, examples of which are illustrated in the accompanying drawing figures.

DETAILED DESCRIPTION

Figure 1A:
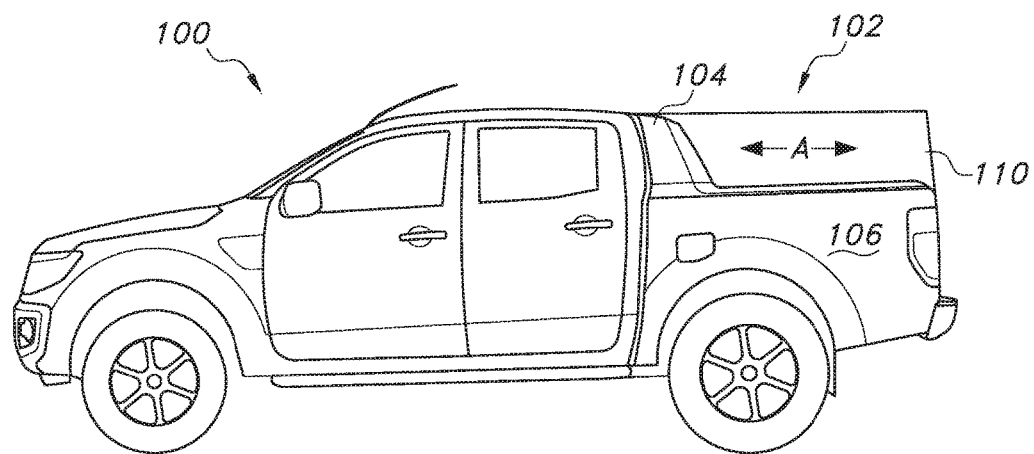
FIG. 1A shows a fully deployed deployable pickup truck bed cap according to the present disclosure.
Figure 1B:
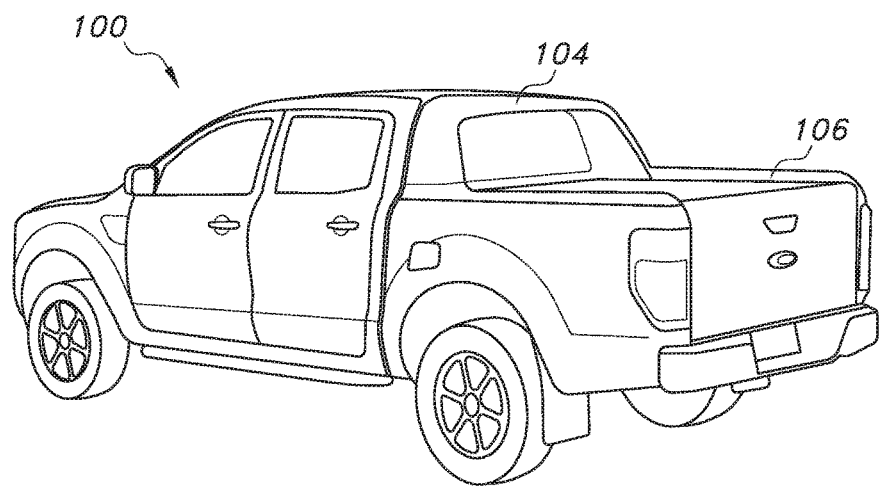
FIG. 1B shows the deployable pickup truck bed cap of FIG. 1A in a fully stowed position.

With reference to FIGS. 1A-1B, there is shown a vehicle 100 equipped with a deployable pickup truck bed cap assembly 102 according to the present disclosure. Optionally, the deployable pickup truck bed cap assembly 102 is stowed within a housing 104, and as will be described is configured to translate between (see arrow A) a fully deployed configuration as shown in FIG. 1A and a fully stowed configuration within the housing as shown in FIG. 1B. It is also contemplated to provide a deployable pickup truck bed cap assembly 102 that is stowed without consideration of a housing 104, however. When fully deployed, the deployable pickup truck bed cap assembly 102 substantially covers an entirely of the pickup truck bed or cargo area 106, thus hiding any contents thereof from view and also protecting the contents from the elements.

Figure 2:
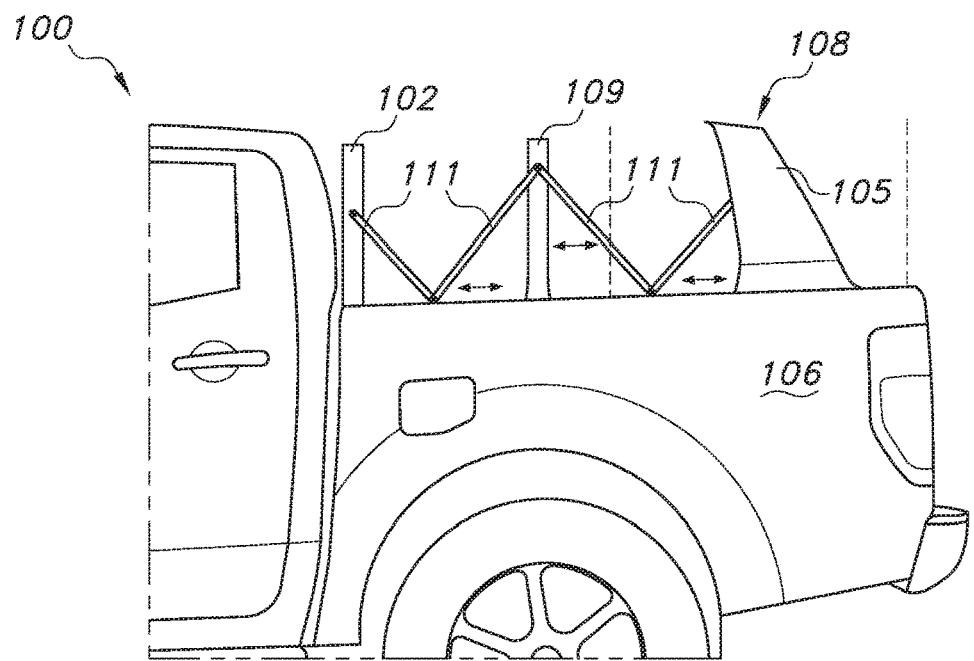
FIG. 2 shows a representative collapsible frame assembly configuration for use in the deployable pickup truck bed cap.

The deployable pickup truck bed cap assembly 102 includes a collapsible frame 108 which, as shown in FIG. 2, can be extended and collapsed between the fully deployed and fully stowed configurations. In use, the collapsible frame 108 is at least partially covered by a flexible cover 110 (see FIG. 1A) made of a suitably flexible, weather-resistant material. In an embodiment, the collapsible frame 108 includes a sliding main frame member 105, a fixed frame member 107, and an intermediate sliding secondary frame member 109. Reinforcing linkages 111 may be provided linking the fixed frame member 107, intermediate sliding secondary frame member 109, and sliding main frame member 105, to provide support and to assist in deploying/retracting the collapsible frame 108 and the associated flexible cover 110 (not shown in this view) as will be described below. As shown in the drawing, retraction or deployment of the sliding main frame member 105 as will be described in detail below causes the collapsible frame 108 to fold or unfold according to the movement of the sliding main frame member.

As will be appreciated, the representative collapsible frame assembly 108 configuration depicted in the drawings figure is but one of many potentially suitable configurations, and will not be held as limiting. Any suitable frame configuration is contemplated, with the caveat that it must be configured to collapse for stowing.

Likewise, use of any suitably flexible, weather-resistant material is contemplated for the manufacture of the flexible cover 110. As non-limiting examples, the flexible cover 110 may be manufactured of a fabric laminate, for example a polyvinyl chloride (PVC)-backed woven acrylic, an embossed-PVC backed woven acrylic, and others. A number of such fabric laminates suitable for this use are known in the art, for example the laminates manufactured by the Haartz® Corporation, Acton, Mass.

Figure 3:
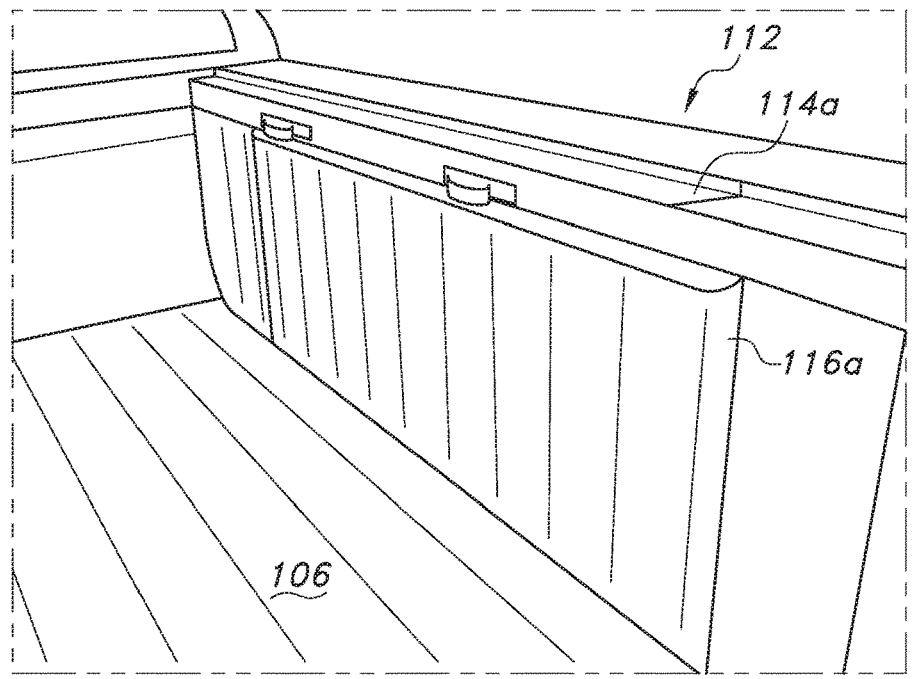
FIG. 3 shows a guide channel for use with a frame guide system according to the present disclosure.

The assembly 102 further includes a frame guide system 112 for guiding the flexible cover 110/collapsible frame assembly 108 between the stowed and deployed positions. With reference to FIG. 3, the frame guide system 112 includes a pair of guide channels 114a, 114b (not shown in this view) disposed at opposed sides 116a, 116b (not shown in this view) of the pickup truck bed 106. Alternatively (embodiment not shown), the guide channels could be disposed on opposed longitudinal edges of the pickup bed floor.

A number of suitable configurations for the frame guide system 112 are contemplated. In an embodiment, an undermount drawer slide-type mechanism of a type well known in the art is contemplated, wherein the guide channels 114a, 114b include bearings or rollers 118 in an interior 120 thereof to ensure smooth sliding translation of rails 122 associated with the sliding main frame member 105 and optionally the intermediate sliding frame member 109 and a portion of the reinforcing linkages 111 (see FIG. 4A). The rail 122 may be operatively connected to a belt or strip 123 for translating the frame members as will be described in detail below.

Figure 4A:
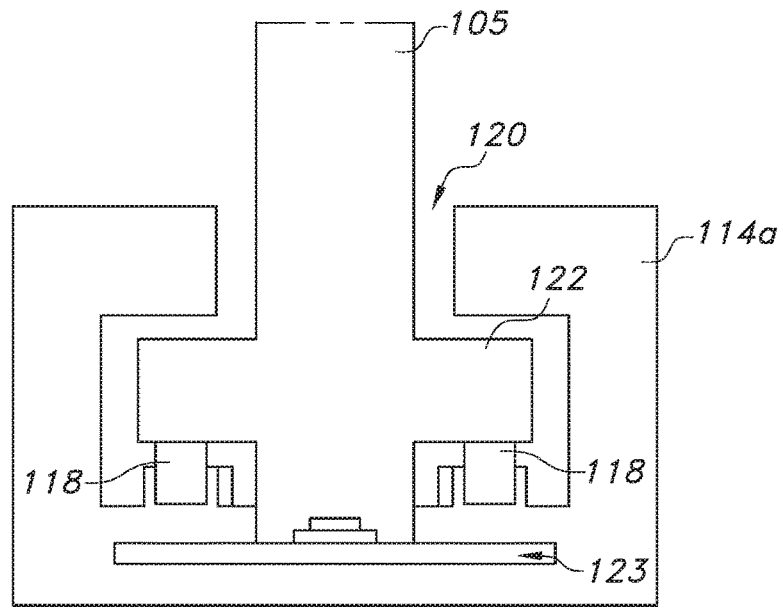
FIG. 4A shows an embodiment of a frame guide system according to the present disclosure.
Figure 4B:
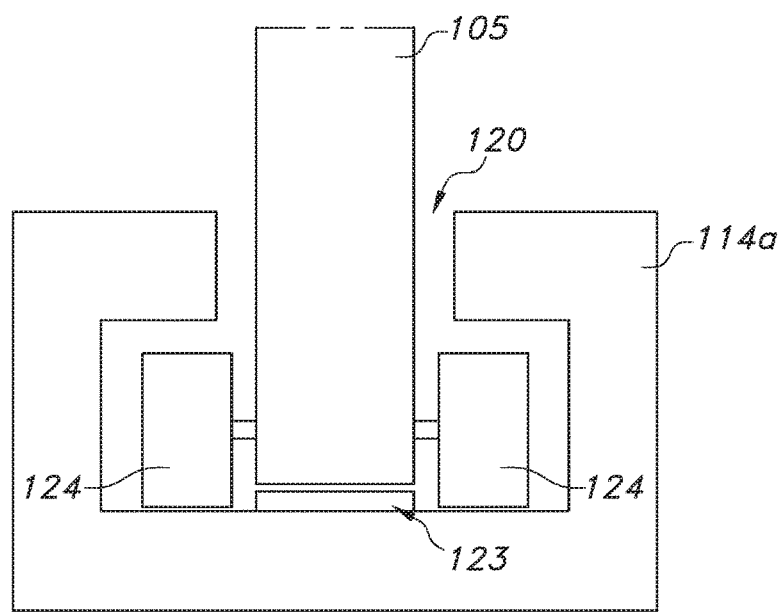
FIG. 4B shows an alternative embodiment of the frame guide system of FIG. 4A.

Alternatively, the main frame member 105 and optionally the intermediate sliding frame member 109 and a portion of the reinforcing linkages 111 may include a plurality of attached rollers, bearings, or wheels 124 configured for sliding translation within the interior channel 120 of guide channels 114a, 114b (see FIG. 4B). Still more (embodiment not shown), the frame guide system may simply comprise collapsible frame assembly 108 rails 122 as shown in FIG. 4A attached to the belt or strip 123 and substantially sealed guide channels 114a, 114b which, by way of added lubricant or by use of materials selected for their natural lubricity, allow sliding translation of the rails 122 within the guide channels by way of the belt or strip 123.

Figure 5:
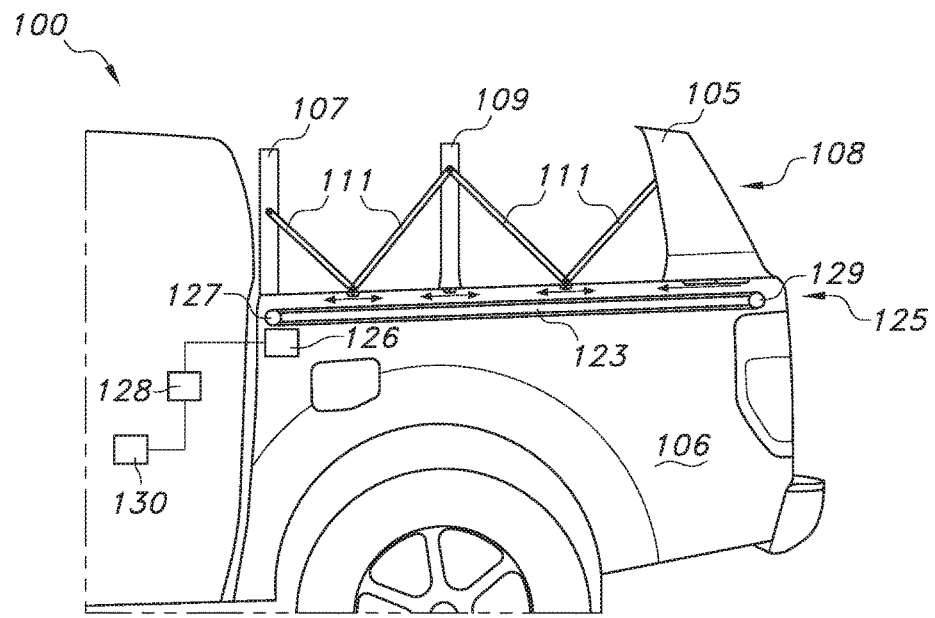
FIG. 5 shows a representative system for effecting deployment and retraction of the collapsible frame assembly.

For operation of the deployable pickup truck bed cap assembly 102, one or more motors 126 are operatively connected to the collapsible frame assembly 108. As shown in FIG. 5, in one embodiment a reversible motor 126 is disposed on each of the right-hand and left-hand side of the vehicle 100 (only one motor shown for convenience). Each motor 126 is operatively connected to a conveyer-type pulley system 125 comprising a first pulley 127 driven by the motor 126, a second pulley 129, and a belt or strip 123 driven by the pulleys and operatively connected to the sliding main frame member 105 and optionally to a portion of the reinforcing linkages 111 and to the sliding intermediate frame member 109, such as by the rails 122 described above. In use, the first pulley 127 is reversibly actuated by the motor 126 to drive the belt or strip 123. In accordance with the direction of rotation of the first pulleys 127 as driven by the reversible motors 126, the collapsible frame assembly 108 is deployed or retracted.

Of course, alternative configurations are possible whereby the one or more motors 126 drive translation of the collapsible frame assembly 108 between the fully stowed and fully deployed positions, and all such configurations are contemplated for use herein. In embodiments, electric motors 126 of a type well known in the art are used, although alternative motor types may be readily incorporated also.

The system further includes a controller 128 configured to control deployment and retraction of the collapsible frame assembly 108. In a representative control system as shown in FIG. 5, in an embodiment the controller 128 is operatively connected to the motor 126, which in turn is operatively connected to the collapsible frame assembly 108 as described above. The controller 128 may be a dedicated microcontroller including a central processing unit (CPU) having its own logic and control software. Alternatively, the controller 128 may be an electronic control unit (ECU) control module associated with the vehicle, for example the vehicle General Electronic Module (GEM), Body Control Module (BCM), Central Control Module (CCM), or others. In yet another alternative embodiment, the controller 128 may communicate with the motor 126 indirectly via a second or third control module communicating with the controller 128 via a vehicle controller area network (CAN), for example, a Local Interconnect Network (LIN) bus.

The controller 128 may be configured to cause the motor 126 to translate the collapsible frame assembly 108 between a fully stowed position and a fully deployed position as described above, and also to one or more intermediate positions therebetween. For example, the controller may include computer executable instructions to define multiple preset configurations of the collapsible frame assembly 108, such as: (1) fully stowed; (2) deployed half-way; and (3)

fully deployed. As will be appreciated, innumerable such intermediate configurations are possible.

One or more actuators 130 are operatively associated, directly or indirectly, with one or both of the controller 128 and the motor(s) 126. In the depicted embodiment, the actuator 130 is operatively associated with the controller 128. The actuator(s) 130 may be any suitable switch, button, touchscreen control, etc. as are well known in the art. The actuator(s) 130 may further be positioned in the vehicle 100 passenger compartment (for example, in the vehicle dash panel, on a vehicle door, as part of a dash panel- or console-mounted touchscreen, as part of a roof panel console, and others), or may be associated with one or more of a key fob, a smartkey, or on the pickup truck bed 106, such as in association with the truck bed 106 liftgate latch.

Figure 6:
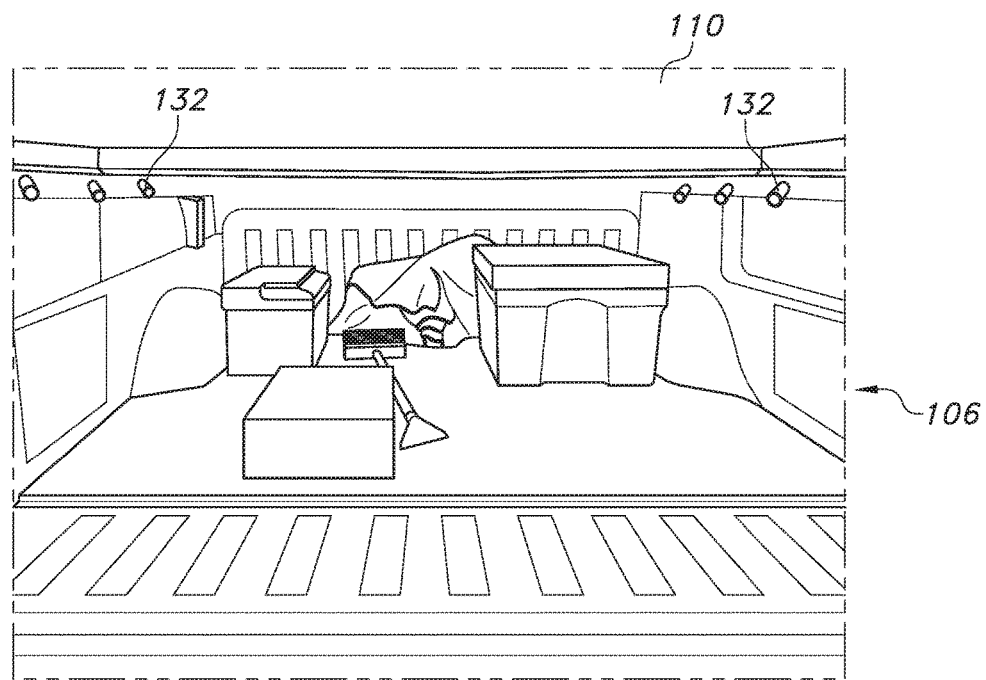
FIG. 6 shows an interior lighting system for the deployable pickup truck bed cap.

Other optional functionalities are contemplated. For example, as shown in FIG. 6 one or more light sources 132 may be provided, disposed to illuminate an interior of the truck bed 106 when the collapsible frame assembly 108 and flexible cover 110 are fully or partially deployed. As will be appreciated, the light sources 132 may be disposed on one or both of the collapsible frame assembly 108 and flexible cover 110, and may be configured for actuation by dedicated switches, or may be automatically actuated upon deployment of the collapsible frame assembly 108/flexible cover 110. Still other convenient functionalities may be provided, such as cargo nets, collapsible boxes, etc. for holding items. These additional features may also be associated with the collapsible frame assembly 108 and/or the flexible cover 110 as needed and as is convenient.

Obvious modifications and variations are possible in light of the above teachings. All such modifications and variations are within the scope of the appended claims when interpreted in accordance with the breadth to which they are fairly, legally and equitably entitled.

What is claimed:

1. A deployable cap assembly for a pickup truck bed of a pickup truck, comprising:
   a folding frame assembly;
   at least one motor operatively connected to the folding frame assembly;
   a frame guide system including a pair of guide channels disposed in opposed pickup truck bed sides; and
   a cap assembly housing translatable between an extended condition and a stowed condition, wherein the folding frame assembly is folded into the cap assembly housing in the stowed position, and wherein the cap assembly housing substantially abuts a passenger compartment of the pickup truck in the stowed condition.

2. The deployable cap assembly of claim 1, further including a flexible cover attached to the folding frame assembly.

3. The deployable cap assembly of claim 1, wherein the at least one motor reversibly drives a pulley system operatively connected to at least a portion of the folding frame assembly for translation between a fully retracted and a fully deployed configuration.

4. The deployable cap assembly of claim 3, wherein the pulley system includes a belt or strip operatively connected to at least a portion of the folding frame assembly.

5. The deployable cap assembly of claim 1, further including a controller operatively connected to the at least one motor and configured to at least partially translate the folding frame assembly between a fully stowed position and a fully deployed position.

6. The deployable cap assembly of claim 5, further including an actuator operatively connected to the at least one motor and/or to the controller.

7. The deployable cap assembly of claim 6, wherein the actuator is associated with one or more of a pickup truck passenger compartment element, a pickup truck door element, a key fob, a smartkey, the pickup truck bed, and a pickup truck bed liftgate.

8. The deployable cap assembly of claim 2, further including one or more actuable light sources for illuminating an interior of the pickup truck bed.

9. A deployable cap assembly for a pickup truck bed of a pickup truck, comprising:
   a folding frame assembly comprising a sliding main frame member, a fixed frame member, and an intermediate sliding secondary frame member;
   a frame guide system disposed within opposed pickup truck bed sides;
   at least one motor operatively connected to the folding frame assembly; and
   a controller operatively connected to the motor and configured to at least partially translate the folding frame assembly between a fully stowed position and a fully deployed position; and
   a cap assembly housing translatable with the folding frame assembly between the fully stowed position and the fully deployed position, wherein the cap assembly housing substantially abuts a cab of the pickup truck in the fully stowed position.

10. The deployable cap assembly of claim 9, further including a flexible cover attached to the folding frame assembly.

11. The deployable cap assembly of claim 9, wherein the frame guide system includes a pair of guide channels disposed within opposed bed sides of the pickup truck bed.

12. The deployable cap assembly of claim 11, wherein the at least one motor reversibly drives a pulley system operatively connected to at least a portion of the folding frame assembly for translation between a fully retracted and a fully deployed configuration.

13. The deployable cap assembly of claim 9, further including an actuator operatively connected to the controller and/or to the at least one motor.

14. The deployable cap assembly of claim 13, wherein the actuator is associated with one or more of a pickup truck passenger compartment element, a pickup truck door element, a key fob, a smartkey, the pickup truck bed, and a pickup truck bed liftgate.

15. The deployable cap assembly of claim 10, further including one or more actuable light sources for illuminating an interior of the pickup truck bed.

16. The deployable cap assembly of claim 9, wherein the folding frame assembly includes a plurality of reinforcing linkages linking the fixed fame member, the intermediate sliding secondary frame member and the sliding main frame member to assist in deploying and retracting the folding frame assembly.

17. The deployable cap assembly of claim 16, wherein retraction and/or deployment of the sliding frame member causes the folding frame assembly to fold or unfold according to movement of the sliding main frame member.

* * * * *